Dec. 19, 1939.  D. BROWN  2,183,763
SLIP DEAERATOR
Filed Sept. 23, 1938  2 Sheets-Sheet 1
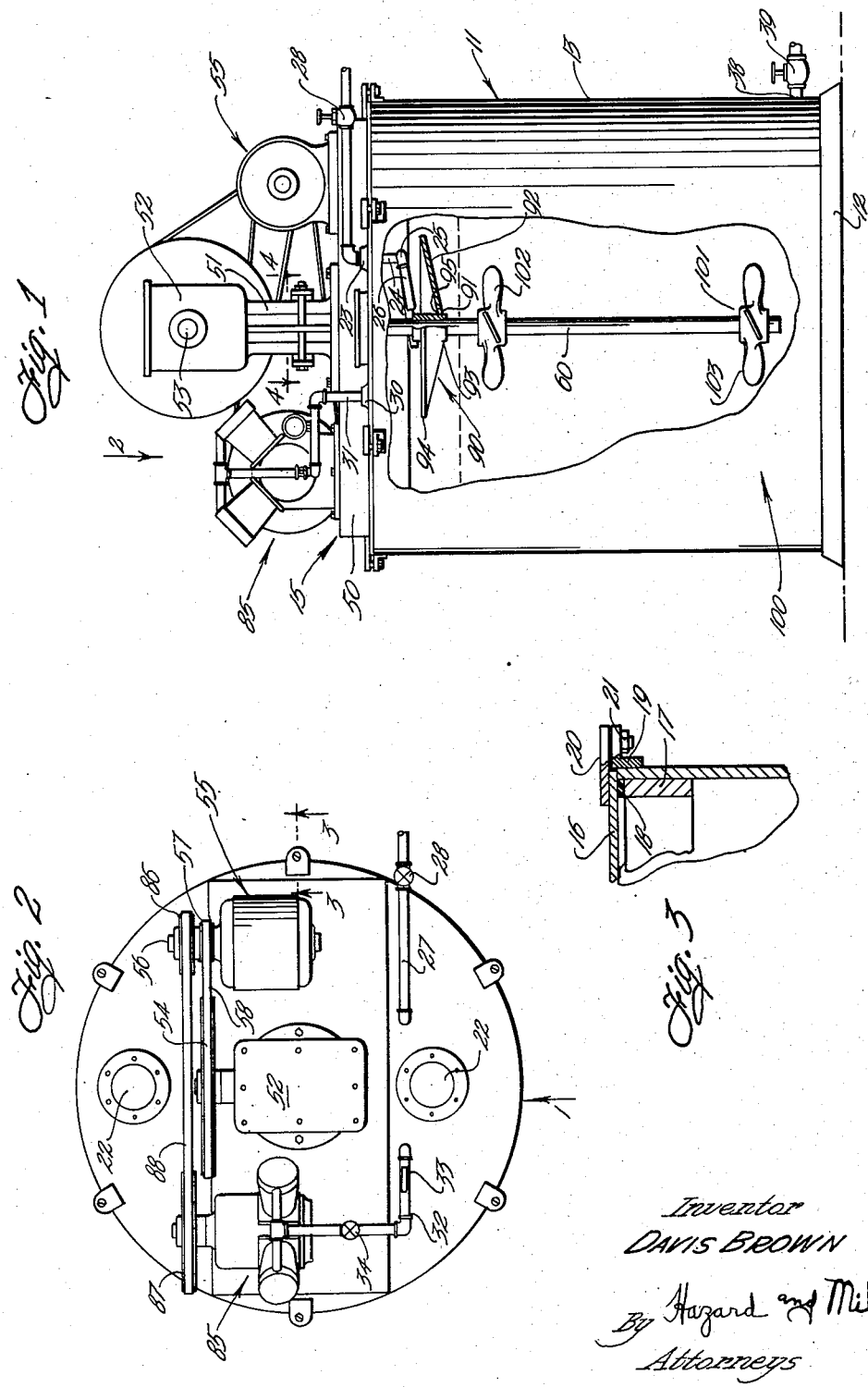
Inventor
DAVIS BROWN
By Hazard and Miller
Attorneys Dec. 19, 1939.  D. BROWN  2,183,763
SLIP DEAERATOR
Filed Sept. 23, 1938    2 Sheets-Sheet 2

Inventor
DAVIS BROWN
By Hazard and Miller
Attorneys

Patented Dec. 19, 1939

2,183,763

UNITED STATES PATENT OFFICE 2,183,763

SLIP DEAERATOR

Davis Brown, Los Angeles, Calif.

Application September 23, 1938, Serial No. 231,371

3 Claims. (Cl. 183—2.5)

My invention relates to preparing slip such as used in casting ceramic ware. Such slip as commonly defined is a mixture of clay, other minerals and chemicals prepared in a semi-liquid form with water and then cast in porous molds which absorb a large proportion of the water from the slip, thus producing the articles in the shapes dependent on the molds. In producing ceramic articles by this procedure, attempts have been made to remove the occluded air and other gases from the slip as such air and gases in the slip produce defects in the finished ware. Such defects appear mainly as minute holes designated pin holes in the surface, however, if the air and gases are not properly removed there are also voids in the interior of the product which prevent the particles of the solid materials coming into the desired intimate contact for the formation of a perfect bond. In produce having a considerable number of voids the ceramic ware has insufficient strength, however, when the air and occluded gases are removed from the slip and this is used to produce cast articles, they have a smooth and better appearing surface, are more dense and hence stronger and more desirable ceramic ware as to all factors.

In the industry various attempts have been made to remove the air and other gases from the slip but most of these are either too slow from a commercial standpoint or do not have a sufficiently large removal of the air and other gases.

An object and feature of my invention from the standpoint of the method and the equipment is the subjection of a flowing body of the slip to sub-atmospheric pressure in the hermetically sealed chamber. This chamber is maintained under a continuous suction and thus is at a minus pressure compared with the atmosphere. In my invention I obtain as high a vacuum as it is commercially suitable within the time limits of preparing the slip. A further feature of my invention is treating a certain amount of the slip as a batch and maintaining the vacuum until the complete batch is treated.

In my process and equipment another feature and characteristic is developing a whirling motion of the slip as it is fed into the top of the hermetically sealed container, this being a form of tank and discharging or throwing this outwardly by centrifugal force. This centrifugal spinning or separating action is by charging the slip adjacent the center portion of a horizontally rotating disk, this being preferably dished with the periphery above the central portion at the hub. The thin film of slip on the disk therefore undergoes a rotating motion in a more or less horizontal plane and is forced outwardly by centrifugal action and discharged at the periphery of the disk in the form of a multitude or almost a mist of fine particles of the slip. This brings the air or occluded gases into intimate contact with the sub-pressure atmosphere so that they are readily taken up and sucked out by the suction pump.

From the mechanical standpoint and movement of the slip in a thin film, this has the characteristics of a thin film of the slip being rapidly moved over a smooth flat surface which due to the velocity, a certain rolling or rippling type of action takes place, thus bringing the minute air or gas particles to the surface and subject to the partial vacuum for their removal. The centrifugal action develops the rapid flow and as the slip is discharged from the periphery of the disk, it is projected laterally with considerable violence. A second type of separating action therefore takes place in the impinging of the film or particles of the slip against the walls of the tank or container. Depending on the velocity of rotation of the centrifugal disk, the particles of the slip have considerable momentum. They are considerably heavier than water, therefore the impact with the stationary surface of the tank jars air and gas particles loose from the body of the slip. A continuing removal of the air and gases is in the downward flow of the slip on the inside walls of the container.

When the slip accumulates in the bottom of the tank and builds up a body from the bottom, I develop an additional separating action by agitation of the body of the slip, this being done preferably by paddles such as the blades of a screw propeller somewhat similar to those used for propelling vessels through water. The agitation causes the minute air and gas bubbles which may be of microscopic size, to contact one with the other, thus merging and by a continuing procedure these bubbles enlarge until they develop sufficient buoyancy to flow upwardly through the mass of the slip. In addition the continual stirring by the propeller type of blades causes an upward movement of a portion of the slip, a surface movement towards or from the center towards the sides of the tank and a downward movement. This may be considered as an upward circulation. At the surface the slip and the bubbles are exposed to the sub-atmosphere and the bubbles breaking and the air and other gases being removed by the suction. This stirring and circular flow motion may be upward in the center and then radially outwardly at the top and down at the sides of a circular tank or in the reverse direction.

The use of the rotating paddles preferably mounted on a central shaft, this also having the centrifugal spinning disk, produces a relatively slow rotary motion of the whole body of the slip in the tank around the center of the shaft. This action also brings the small bubble particles in contact causing these to enlarge and at the surface gives agitation to break the bubbles.

When this action occurs and the slip is at the desired level slightly below the bottom of the centrifugal disk, the feed supply of the slip is cut off, any portions remaining in the disk drain through small openings, the agitating paddles are continued in operation while the slip is discharged through discharge ducts at the bottom of the tank. Of course to do this, the vacuum is what is termed broken, that is, the suction valve is closed and a valve connecting to atmosphere is opened, this restoring atmospheric pressure to the tank above the slip and allowing discharge by gravity. A further detail feature of my invention suitable in some applications, is using the vacuum created as a means for supplying the slip through the said pipes.

My invention is illustrated in connection with the accompanying drawings, in which:

Fig. 1 is a side elevation with the tank partly broken away showing a suitable assembly embodying my invention.

Fig. 2 is a plan taken in the direction of the arrow 2 of Fig. 1.

Fig. 3 is a detail section of a corner taken on the line 3—3 of Fig. 2 in the direction of the arrows on an enlarged scale.

Figure 4:
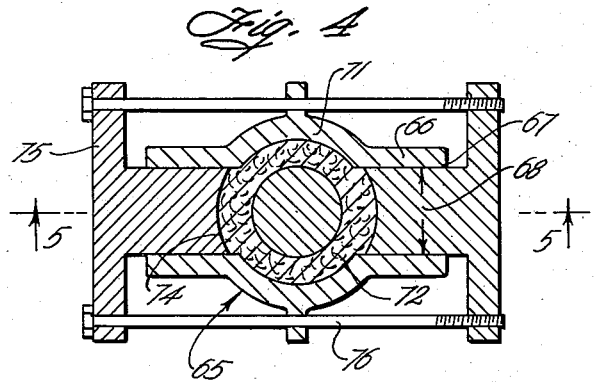
Fig. 4 is a horizontal section on the line 4—4 of Fig. 1 illustrating the construction for packing the drive shaft for maintenance of a vacuum in the tank.
Figure 5:
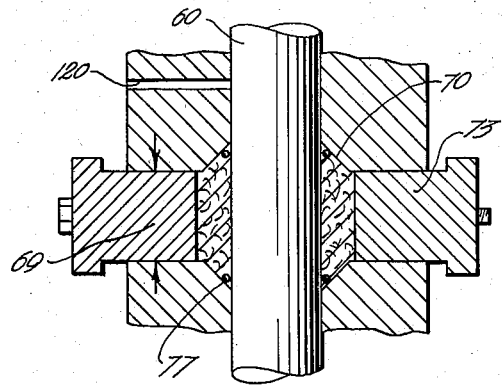
Fig. 5 is a vertical section on the line 5—5 of Fig. 4 in the direction of the arrows.

In my invention I employ an enclosed tank 11 which is depicted as having a closed base 12, cylindrical side walls 13, a cover assembly 15, such cover having a cover plate 16. As it is necessary to provide a gas tight seal, this may be done in any suitable manner. The arrangement shown employs a substantial ring 17, note Fig. 3, secured to the upper edge of the wall 13 of the tank by welding or the like. A compressible gasket 18 rests on the upper edge of this rim-like ring. The cover is clamped in place by utilizing brackets 19 on the wall of the tank and projecting lug plates 20 with bolts or screws 21 thereby presenting an air tight construction. The cover plate of the tank has a plurality of windows 22 made in any suitable manner for observation of the operation on the slip. A boss 23 on the cover plate provides an opening for a drop pipe 24 for the slip. To this there is connected an elbow 25 and two discharge pipes 26, these discharging on opposite sides of the shaft and hub hereunder detailed to equalize the flow of the slip. Such slip is delivered through a feed pipe 27 having a control valve 28 therein. The slip may be fed from any suitable supply source and in some cases may be drawn into the tank by the partial vacuum created as hereunder detailed.

The cover or lid of the tank is also provided with a second boss or similar construction 30 from which extends a vertical vacuum pipe 31. To this is connected the desired length of suction pipes 32 in which there is a pressure gauge 33 and an air valve 34 for so-called breaking or cracking the vacuum. The slip is fed out of the tank through a discharge pipe 38 having a valve 39.

For sake of convenience I prefer to mount the drive mechanism for operating the disk and paddle blades by an equipment mounted directly on the cover forming part thereof. Therefore in the cover assembly 15 I provide a base construction 50 on which is mounted a central pedestal 51, this being of any desired character and having a gear case 52 at the top. This gear case has a transversely mounted shaft 53 therein and provided on the outside with a suitable drive pulley 54. An electric motor assembly 55 is also mounted on the base 50 and is indicated as having a drive shaft 56 with a pulley 57 and a belt drive 58 to the pulley 54 and thus operating the shaft 53. This shaft is connected by any type of suitable gear such as bevel gears in the gear housing to the main operating shaft 60, note particularly Figs. 2, 4, 5 and 6. This shaft is suitably journaled in the central pedestal 51 and is supported by any type of thrust bearings so that the shaft is suspended in the tank. The lower end of the shaft preferably is above the bottom of the tank and there is no journal for the shaft inside of the tank where it might be subject to being flooded with the slip.

It is necessary however to have an air tight seal for the shaft 60 to prevent leakage of air or oil longitudinally of the shaft. This is indicated as to a suitable construction in Figs. 4 and 5 and designated by the packing assembly 65. The pedestal 51 has a central portion 66 with an opening 67 defined by the horizontal measurement 68, Fig. 4 and a vertical measurement 69 of Fig. 5. There are also preferably suitable internal bevels 70 and recesses 71 formed at the sides of the pedestal. This forms a space in which packing 72 is inserted and maintained in place by packing glands or plugs 73 which fit the opening 67. These are formed preferably arcuate on their inside surface 74, the curvature being in a horizontal plane and preferably concentric to the shaft. Each of the plugs has a suitable head 75 and the opposite heads are connected by tie bolts 76, thus bringing the desired pressure on the packing. The packing is preferably further confined by tight rope-like rings 77.

In order to create the partial vacuum a suitable vacuum pump designated 85 is utilized, this being driven by the electric motor by providing the motor with a second pulley 86 and the vacuum pump also with a pulley 87, there being the belt drive 88.

In the treating of the slip I cause a first action by flowing the slip over a smooth surface. For sake of compactness this is designated as the centrifugal separation disk 90, note Figs. 2 and 6. This disk preferably has a hub 91 attached in any suiable manner to the shaft 60 and positioned the desired distance below the cover plate. An inverted cone 92 extends outwardly from the hub, this having a low portion 93 adjacent the hub and the peripheral edge 94 being at a higher elevation. There are one or more quite small drain openings 95. The slip as above mentioned is discharged by the two pipes 26 onto the disk adjacent the hub so that it first drops on the lowermost part of the inverted cone. Of course it is obvious that the shape of the disk may be changed. This may be flat or if desired may form a cone with the apex uppermost. Where a cone is used also the angle to the apex may vary considerably as also the diameter of the cone in reference to the diameter of the tank.

Another separation of the occluded gases is by the agitating assembly designated 100. This includes a plurality of propeller-like structures indicated as 101 at the bottom and 102 spaced below the disk. These are both secured to the shaft and each have vanes or blades designated 103 with a suitable pitch to direct a longitudinal flow of the slip in regard to the shaft 60 It is manifest that these propellers may be of different diameters and have a variable number of blades depending upon the particular type of slip to be treated and the action desired.

The manner of operation and functioning of my invention and the method of treatment involves first proceeding with an empty tank, the outlet valve for the slip 39 is closed, the electric motor is started or other suitable means to actuate the vacuum pump. The air vent valve 34 is closed so that there is the full suction of the pump on the interior of the tank to exhaust the air. In the initial action the valve 28 controlling the flow of slip is also preferably closed and there is no flow of slip to the tank. If desired by means of suitable clutches, the shaft 60 may be maintained at rest during the procedure of creating the vacuum, that is, the sub-atmospheric pressure in the tank. A reading of this pressure may be obtained on the gauge 33.

In starting the actual separation of the occluded gases from the slip, the shaft is rotated at the desired speed and the vacuum pump is continued in operation to maintain a continuous suction. The slip is fed to the tank either by gravity, by pumps or by the suction of the partial vacuum and is delivered at a regulated rate through the pipes 26, discharging on both sides of the hub of the disk. These two discharges balance the weight on the disk so that there is not any unbalanced centrifugal force developed. The slip having considerable viscosity acquires the rotary motion of the disk and in this rotary motion as its speed increases, the centrifugal force causes the slip to flow outwardly towards the periphery of the disk. In the illustrations shown the slip has to rise upwardly against the force of gravity, this tending to develop a thin and somewhat uniform film of slip covering the whole disk. In this action of the thin film of disk flowing over smooth surface, there may be developed a series of ripple-like movements similar to flowing any somewhat viscous liquid downwardly by gravity over a smooth surface. This ripple-like action brings various portions of the film towards the upper surface where such surface is subject to the partial vacuum which is maintained as the sub-atmospheric pressure in the tank. The air and other occluded gases in the slip are therefore facilitated in their escape. These gases are then carried outwardly through the vacuum connection which it is manifest may be from some other source than the vacuum pump.

Figure 6:
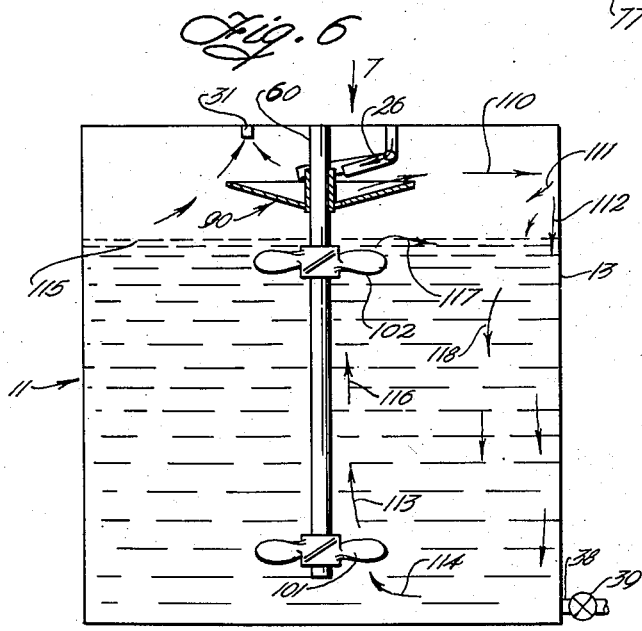
Fig. 6 is a vertical flow diagram illustrating the circulation of the slip and the withdrawal of the air or other occluded gases.

Due to the centrifugal force developed in the slip flowing outwardly over the rotating disk assembly 90, there is a more or less horizontal sheet or spray indicated by the arrow 110 of Fig. 6 showing the discharge from the periphery of the disk. This is usually in the form of fine droplets which also expose a large surface area to the sub-atmospheric pressure facilitating discharge of the occluded gases. It is preferable to proportion the disk and the tank so that the more or less horizontal spray of the film of slip impinges on the tank as indicated at 111 of Fig. 6. Depending on the speed of rotation of the disk and the diameter of the tank, this body of slip usually strikes with considerable force. The structure of the flowing slip is therefore suddenly changed, again exposing large and different surface areas to the sub-atmospheric pressure and exposing occluded gases for their removal to the sub-atmosphere. This slip then streams downwardly as indicated by the arrow 112 on the inside surface of the tank. In this downward flow due principally to gravity, large surface areas are also exposed to the partial vacuum.

The separation of the occluded gases by the agitating action of the paddles or agitators 100 may be considered substantially as follows, referring to Fig. 6. It is preferable to rotate the shaft and these propellers so that they have a tendency to lift, that is, direct an upward flow of the slip somewhat longitudinally of the shaft 60. The slip flowing downwardly along the side of the tank builds up a first body in the bottom without any agitation until it reaches the lower propeller 101. This propeller develops an upward flow indicated by the arrow 113 and thus brings the somewhat horizontal flow 114 along the bottom of the tank. As the slip builds upwardly it reaches the upper propeller 102 which continues and maintains the upward flow. However it is desirable to fill the tank only to a surface level marked 115, Fig. 6, slightly below the disk. As the flow of the disk continues upwardly in the center portion of the tank as indicated at 116, there is an outward flow 117 from the top towards the walls of the tank and thence downwardly more or less in the direction of the arrows 118. In this agitation minute what might be considered as microscopic bubbles of air or other occluded gases in the slip are driven together forming slightly larger bubbles which in their turn are beaten so as to contact other bubbles, these increasing in size until they have sufficient buoyancy to rise upwardly through the body of the slip in the tank. This upward flow at the center is facilitated by the upward flow of the slip. These bubbles break at the surface, discharging the air and occluded gases into the sub-atmospheric pressure and are exhausted through the vacuum assembly.

Figure 7:
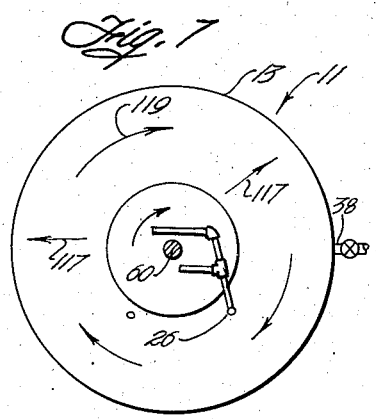
Fig. 7 is a partial plan in diagram taken in the direction of the arrow 7 of Fig. 6 illustrating the delivery and spread of the slip.

In addition the slip develops a somewhat circular motion. Due to the operation of the propellers, this may be somewhat as shown in Fig. 7 by the circulating action indicated at the arrows 119 which gives a slow intermingling and stirring. All of this action in the tank is operative to not only combine minute into larger bubbles but bring a changing surface exposed at the top and facilitates the removal of the occluded gases. By observation through the windows the agitation of the slip may be continued until practically no more bubbles are observable. Of course it may be understood that when the operation on the complete body of the slip is being carried on, no more slip is being fed into the tank as the desired surface level has been reached. The centrifugal action causes the slip to be cleared off the disk, however any accumulation when the assembly is stopped may drain through the small drain openings 95.

When the procedure is completed to the satisfaction of the operator, the vacuum is so-called cracked, that is the air vent valve 34 is opened admitting air under atmospheric pressure to the inside of the tank. The agitation or stirring however is maintained, the valve 39 for the discharge of the slip is open and the slip is drained out maintaining the agitation, this being more for the purpose of stirring and preventing any settlement due to different densities of the slip. When the tank is empty, the action may be repeated, thus the slip is handled in batches.

In view of the fact that the gear case 52 contains a body of lubricating oil for the driving gears, the anti-friction suspension bearings and for lubricating the bearing of the shaft 60, it is desirable in the pedestal 51 to provide a small oil drainage duct designated 120 (Fig. 5), this being located above the packing 72.

Various changes may be made in the details of the construction without departing from the spirit or scope of the invention as defined by the appended claims.

I claim:

1. In a device as described, the combination of a closed tank, a suction means connected to said tank to create a partial vacuum therein, a feed means for slip adjacent the top of the tank, a vertical shaft depending in the tank, there being a clearance below the lower end of the shaft and the bottom of the tank, a plurality of propeller type of agitators mounted on the shaft, means located above the tank to rotate said shaft, a disk mounted on the shaft above the uppermost propeller, a discharge means for the slip depositing the slip on the disk whereby the slip develops a rotation with the disk and is discharged at its periphery by centrifugal action above the surface of the slip in the tank, the propellers being operated to produce an upward and a downward circulation of the body of the slip as it fills the tank, the suction means being operative to remove occluded air and gases separated from the slip.

2. In a device as described, the combination of a closed tank, a suction means connected to said tank to create a partial vacuum therein, a feed means for slip adjacent the top of the tank, a vertical shaft depending in the tank, there being a clearance below the lower end of the shaft and the bottom of the tank, a plurality of propeller type of agitators mounted on the shaft, means located above the tank to rotate said shaft, a disk mounted on the shaft above the uppermost propeller, a discharge means for the slip depositing the slip on the disk whereby the slip develops a rotation with the disk and is discharged at its periphery by centrifugal action above the surface of the slip in the tank, the propellers being operated to produce an upward and a downward circulation of the body of the slip as it fills the tank, the suction means being operative to remove occluded air and gases separated from the slip, the propellers having blades extending outwardly radially from the shaft and being operative to develop a rotary circulating movement of the slip relative to the vertical axis of the shaft.

3. In a device as described, a closed cylindrical tank having its axis vertical with a cover at the top, a shaft extending downwardly through the cover and having a suspending bearing with a driving means outside of the tank, a suction means connected to the tank to create a subatmospheric pressure therein, a disk mounted on the shaft, means to discharge slip on the disk at a plurality of equidistant points from the shaft, a plurality of propellers with blades mounted on the shaft below the disk, an outlet for slip at the bottom of the tank, the rotation of the shaft producing a rotational movement of the slip on the disk causing such slip to flow outwardly by centrifugal action and discharge over the peripheral edge of the disk above the surface of the slip in the tank, the propeller blades being positioned at an angle to develop a central upward flow of the slip in proximity to the shaft and a downward flow remote therefrom together with substantially a radial surface flow from the shaft outwardly, means to stop the feeding of the slip, means to equalize internal pressure in the tank and the external air pressure, the suction means being operative to remove occluded air and other gases separated from the slip and discharged into the internal atmosphere in the tank.

DAVIS BROWN.